(12) United States Patent
Fujii et al.

(10) Patent No.: US 10,802,462 B2
(45) Date of Patent: Oct. 13, 2020

(54) MACHINING CONDITION SELECTING DEVICE FOR MACHINE TOOL

(71) Applicant: FANUC CORPORATION, Yamanashi (JP)

(72) Inventors: Takaaki Fujii, Yamanashi (JP); Zheng Tong, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 33 days.

(21) Appl. No.: 16/132,576

(22) Filed: Sep. 17, 2018

(65) Prior Publication Data

US 2019/0121314 A1  Apr. 25, 2019

(30) Foreign Application Priority Data

Oct. 23, 2017 (JP) ................................ 2017-204256

(51) Int. Cl.
- *G05B 19/401* (2006.01)
- *G05B 19/4093* (2006.01)
- *G05B 19/418* (2006.01)

(52) U.S. Cl.
CPC ..... *G05B 19/401* (2013.01); *G05B 19/40938* (2013.01); *G05B 19/41875* (2013.01);
(Continued)

(58) Field of Classification Search
CPC ........... G05B 2219/31325; G05B 2219/36284; G05B 19/401; G05B 19/41875; G05B 19/40938; G05B 2219/32422
See application file for complete search history.

(56) References Cited

U.S. PATENT DOCUMENTS

| 5,751,589 A * | 5/1998 | Sato ...................... B23H 7/20 |
| | | 700/162 |
| 2001/0027354 A1* | 10/2001 | Kakino .............. G05B 19/4163 |
| | | 700/173 |

(Continued)

FOREIGN PATENT DOCUMENTS

| CN | 1449513 A | 10/2003 |
| CN | 1763671 A | 4/2006 |

(Continued)

OTHER PUBLICATIONS

An Office Action mailed by the State Intellectual Property Office of the People's Republic of China dated Mar. 4, 2020, which corresponds to Chinese Patent Application No. 201811210942.7 and is related to U.S. Appl. No. 16/132,576; with English language translation.

*Primary Examiner* — Mohammad Ali
*Assistant Examiner* — Vincent W Chang
(74) *Attorney, Agent, or Firm* — Studebaker & Brackett PC (57) ABSTRACT

A machining condition selecting device includes a machining condition contribution data management unit configured to manage machining condition contribution data in which each of a plurality of machining conditions is associated with a 3-dimensional surface roughness parameter and degrees of contribution to each item of a required condition related to productivity of a target product; a matter of priority acquisition unit configured to acquire a combination of the 3-dimensional surface roughness parameter and at least one item of the required condition as a matter of priority; and a machining condition selection data management unit configured to manage, for each of the plurality of machining conditions, machining condition selection data in which a combination pattern of the matters of priority is (Continued)

| MACHINING CONDITION \ MATTER OF PRIORITY | STREAK SHEEN MACHINING TIME COST | REGULATION PRIORITY | STREAK MACHINING TIME COST | REGULATION PRIORITY | SHEEN MACHINING TIME COST | REGULATION PRIORITY |
|---|---|---|---|---|---|---|
| TYPE OF TOOL | 27 | 6 | 17 | 9 | 17 | 9 |
| TYPE OF CUTTING FLUID | 24 | 8 | 17 | 9 | 23 | 3 |
| HOLDER ROTATIONAL BALANCE CONTROL | 28 | 5 | 24 | 4 | 20 | 8 |
| MAIN AXIS ROTATIONAL NUMBER/FEED RATE CONTROL | 34 | 1 | 25 | 3 | 25 | 1 |
| DEPTH SETTING CONTROL | 29 | 2 | 21 | 5 | 24 | 2 |
| AXIS OPERATION CONTROL | 29 | 2 | 27 | 1 | 22 | 5 |
| STRUCTURE OF JIG | 20 | 10 | 19 | 7 | 17 | 9 |
| MACHINING PROGRAM | 25 | 7 | 20 | 6 | 21 | 7 |
| SELECTION OF MATERIAL FOR WORKPIECE | 24 | 8 | 18 | 8 | 22 | 5 |
| MECHANICAL VIBRATION REDUCTION | 29 | 2 | 26 | 2 | 23 | 3 | associated with a sum of the degrees of contribution to each item in the combination pattern.

5 Claims, 6 Drawing Sheets

(52) U.S. Cl.
CPC .............. *G05B 2219/31325* (2013.01); *G05B 2219/32422* (2013.01); *G05B 2219/36283* (2013.01); *G05B 2219/36284* (2013.01)

(56) References Cited

U.S. PATENT DOCUMENTS

| | | | | |
|---|---|---|---|---|
| 2013/0190920 A1* | 7/2013 | Michishita | ............. | G05B 19/18 700/175 |
| 2016/0228954 A1* | 8/2016 | Lemmer | ................ | C23C 16/27 |
| 2017/0050255 A1* | 2/2017 | Davidson | ............... | B23K 9/093 |
| 2019/0134767 A1* | 5/2019 | Nishikawa | ......... | G05B 19/4063 |

FOREIGN PATENT DOCUMENTS

| | | |
|---|---|---|
| CN | 103941641 A | 7/2014 |
| CN | 104942806 A | 9/2015 |
| CN | 105843172 A | 8/2016 |
| JP | H08-297024 A | 11/1996 |
| JP | H09-026811 A | 1/1997 |
| JP | 2002-283191 A | 10/2002 |
| JP | 2006-107073 A | 4/2006 |
| JP | 2010-240800 A | 10/2010 |
| JP | 2016-130908 A | 7/2016 |
| JP | 2017-156170 A | 9/2017 |
| JP | 2017-215675 A | 12/2017 |

* cited by examiner

FIG .2

| MACHINING CONDITION | STREAK (Str) | SHEEN (Sdq) | MACHINING TIME | COST |
|---|---|---|---|---|
| TYPE OF TOOL | 10 | 10 | 6 | 1 |
| TYPE OF CUTTING FLUID | 1 | 7 | 10 | 6 |
| HOLDER ROTATIONAL BALANCE CONTROL | 8 | 4 | 10 | 6 |
| MAIN AXIS ROTATIONAL NUMBER/FEED RATE CONTROL | 9 | 9 | 6 | 10 |
| DEPTH SETTING CONTROL | 5 | 8 | 6 | 10 |
| AXIS OPERATION CONTROL | 7 | 2 | 10 | 10 |
| STRUCTURE OF JIG | 3 | 1 | 10 | 6 |
| MACHINING PROGRAM | 4 | 5 | 6 | 10 |
| SELECTION OF MATERIAL FOR WORKPIECE | 2 | 6 | 10 | 6 |
| MECHANICAL VIBRATION REDUCTION | 6 | 3 | 10 | 10 |

FIG. 3A

| MATTER OF PRIORITY / MACHINING CONDITION | STREAK SHEEN MACHINING TIME COST | REGULATION PRIORITY | STREAK MACHINING TIME COST | REGULATION PRIORITY | SHEEN MACHINING TIME COST | REGULATION PRIORITY |
|---|---|---|---|---|---|---|
| TYPE OF TOOL | 27 | 6 | 17 | 9 | 17 | 9 |
| TYPE OF CUTTING FLUID | 24 | 8 | 17 | 9 | 23 | 3 |
| HOLDER ROTATIONAL BALANCE CONTROL | 28 | 5 | 24 | 4 | 20 | 8 |
| MAIN AXIS ROTATIONAL NUMBER/FEED RATE CONTROL | 34 | 1 | 25 | 3 | 25 | 1 |
| DEPTH SETTING CONTROL | 29 | 2 | 21 | 5 | 24 | 2 |
| AXIS OPERATION CONTROL | 29 | 2 | 27 | 1 | 22 | 5 |
| STRUCTURE OF JIG | 20 | 10 | 19 | 7 | 17 | 9 |
| MACHINING PROGRAM | 25 | 7 | 20 | 6 | 21 | 7 |
| SELECTION OF MATERIAL FOR WORKPIECE | 24 | 8 | 18 | 8 | 22 | 5 |
| MECHANICAL VIBRATION REDUCTION | 29 | 2 | 26 | 2 | 23 | 3 |

FIG. 3B

| STREAK SHEEN MACHINING TIME | REGULATION PRIORITY | STREAK SHEEN COST | REGULATION PRIORITY | STREAK MACHINING TIME | REGULATION PRIORITY | STREAK COST | REGULATION PRIORITY | SHEEN MACHINING TIME | REGULATION PRIORITY | SHEEN COST | REGULATION PRIORITY |
|---|---|---|---|---|---|---|---|---|---|---|---|
| 26 | 1 | 21 | 3 | 16 | 3 | 11 | 7 | 16 | 2 | 11 | 8 |
| 18 | 7 | 14 | 8 | 11 | 8 | 7 | 10 | 17 | 1 | 13 | 4 |
| 22 | 3 | 18 | 7 | 18 | 1 | 14 | 5 | 14 | 5 | 10 | 9 |
| 24 | 2 | 28 | 1 | 15 | 5 | 19 | 1 | 15 | 4 | 19 | 1 |
| 19 | 4 | 23 | 2 | 11 | 8 | 15 | 4 | 14 | 5 | 18 | 2 |
| 19 | 4 | 19 | 4 | 17 | 2 | 17 | 2 | 12 | 8 | 12 | 6 |
| 14 | 10 | 10 | 10 | 13 | 6 | 9 | 8 | 11 | 9 | 7 | 10 |
| 15 | 9 | 19 | 4 | 10 | 10 | 14 | 5 | 11 | 9 | 15 | 3 |
| 18 | 7 | 14 | 8 | 12 | 7 | 8 | 9 | 16 | 2 | 12 | 6 |
| 19 | 4 | 19 | 4 | 16 | 3 | 16 | 3 | 13 | 7 | 13 | 4 |

FIG. 4

MACHINING CONDITION SELECTING DEVICE FOR MACHINE TOOL

This application is based on and claims the benefit of priority from Japanese Patent Application No. 2017-204256, filed on 23 Oct. 2017, the content of which is incorporated herein by reference.

BACKGROUND OF THE INVENTION

Field of the Invention

The present invention relates to a machining condition selecting device for a machine tool.

Related Art

In the field of surface finishing using a machine tool, cutting surfaces are now finished at a higher quality due to the development of tools and machines. For example, metal surfaces can now be finished to look almost like mirrors. As a conventional technology related to this type of surface finishing, there is known a machining method of selecting appropriate machining conditions on the basis of input data to achieve highly precise finishing on a target product (see, for example, Patent Literature 1 to 3).

Patent Document 1: Japanese Unexamined Patent Application, Publication No. H09-26811
Patent Document 2: Japanese Unexamined Patent Application, Publication No. 2017-156170
Patent Document 3: Japanese Unexamined Patent Application, Publication No. H08-297024

SUMMARY OF THE INVENTION

Two-dimensional surface roughness parameters such as Ra (arithmetical mean roughness) and Rz (maximum roughness depth) are traditionally used as parameters that quantitatively express the quality of a cutting surface that is finished with high quality. However, cutting surfaces of target products may have different visual quality (in other words, aesthetic) when compared despite having the same two-dimensional roughness parameters. Therefore, machining with only two-dimensional parameters in mind makes it difficult to produce a product with high visual quality. Reductions in machining time and cost are also sometimes required in addition to a good appearance. In light of this, machining that produces a high-quality target product needs to be efficient in order to achieve acceptable visual quality and the required machining time and costs (hereinafter collectively referred to as "matters of priority").

It is an object of the present invention to provide a machining condition selecting device for a machine tool that can effectively perform high-quality machining on a target product.

(1) The present invention relates to A machining condition selecting device (1) for a machine tool that includes: a machining condition contribution data management unit (for example, a machining condition contribution data management unit 111 to be described later) configured to manage machining condition contribution data in which each of a plurality of machining conditions that a machine tool can perform when machining a target product is associated with degrees of contribution to each item of a 3-dimensional surface roughness parameter of a cutting surface of the target product and degrees of contribution to each item of a required condition related to productivity of the target product; a matter of priority acquisition unit (for example, a matter of priority acquisition unit 112 to be described later) configured to acquire a combination of at least one item of the 3-dimensional surface roughness parameter and at least one item of the required condition as a matter of priority specified by an operator; and a machining condition selection data management unit (for example, a machining condition selection data management unit 113 to be described later) configured to manage, for each of the plurality of machining conditions, machining condition selection data in which a combination pattern of items that can be specified as the matter of priority is associated with a sum of the degrees of contribution to each item in the combination pattern, in which the machining condition selection data management unit selects a machining condition on the basis of the sum of the degrees of contribution associated with the combination pattern of the machining condition selection data matching the combination of the matters of priority.

(2) In the machining condition selecting device for a machine tool according to (1), the machining condition contribution data management unit may be configured to change the degrees of contribution in the machining condition contribution data on the basis of a different value between an actual measurement value and a target value of the 3-dimensional surface roughness parameter included in the matter of priority, and the machining condition selection data management unit may be configured to change the sum of the degrees of contribution in the machining condition selection data on the basis of the changed degrees of contribution in the machining condition contribution data.

(3) In the machining condition selecting device for a machine tool according to (1) or (2), the 3-dimensional surface roughness parameter may include at least one of a depth parameter that represents depth of unevenness in the cutting surface of the target product; a spatial parameter that represents presence of streak in the cutting surface of the target product; and a composite parameter that represents sheen of the cutting surface of the target product.

(4) In the machining condition selecting device for a machine tool according to any one of (1) to (3), the plurality of machining conditions may include at least two of type of tool, type of cutting fluid, holder rotational balance control, main axis rotational number/feed rate control, depth setting control, axis motion control, structure of jig, machining program, selection of material for workpiece, and mechanical vibration reduction.

According to the present invention, there can be provided a machining condition selecting device for a machine tool that can effectively perform high-quality machining on a target product.

DETAILED DESCRIPTION OF THE INVENTION

First Embodiment

Figure 1:
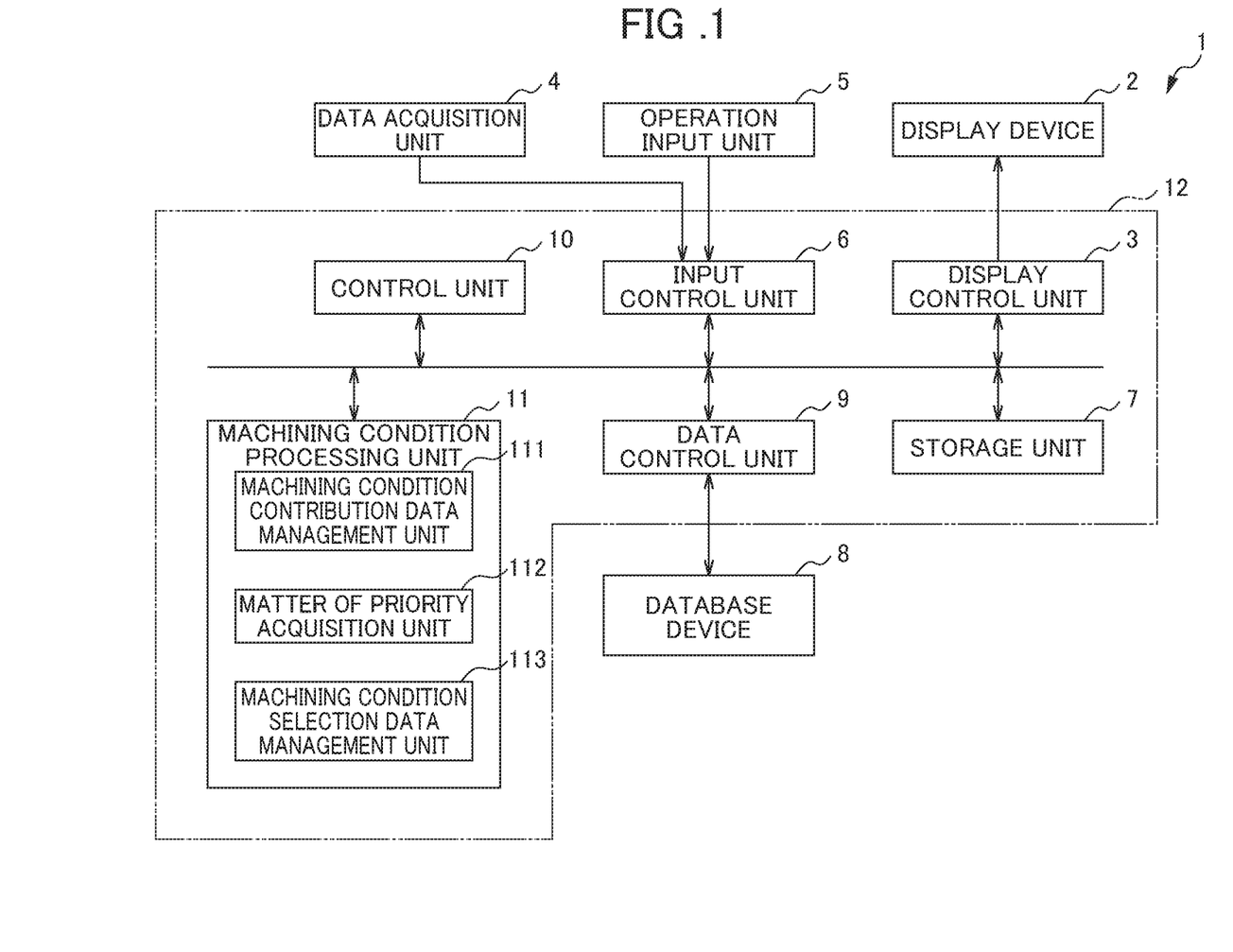
FIG. 1 is a block diagram for illustrating the configuration of a machining condition selecting device 1 for a machine tool according to a first embodiment.

FIG. 1 is a block diagram for illustrating the configuration of a machining condition selecting device 1 for a machine tool according to a first embodiment. The machining condition selecting device 1 according to the first embodiment is a device configured to select optimal machining conditions for matters of priority concerning a workpiece (target product) among machining conditions that can be performed by a machine tool (not shown). Note that the configuration of the machining condition selecting device 1 according to the first embodiment is substantially the same as the machining condition selecting device 1 according to a second embodiment to be described later.

As illustrated in FIG. 1, the machining condition selecting device 1 according to the first embodiment includes a display device 2, a display control unit 3, a data acquisition unit 4, an operation input unit 5, an input control unit 6, a storage unit 7, a database device 8, a data control unit 9, a control unit 10 and a machining condition processing unit 11. The display control unit 3, the input control unit 6, the storage unit 7, the data control unit 9, the control unit 10 and the machining condition processing unit 11 make up a device body 12.

The display device 2 is a display device that can display various types of data, messages, diagrams, and the like. For example, an item of a 3-dimensional surface roughness parameter with an actual measurement value that does not meet a target value (described later) is displayed on the display device 2. The display control unit 3 controls the display of the various types of data on the display device 2. The display control unit 3 causes the display device 2 to display, for example, machining condition contribution data (see FIG. 2) and machining condition selection data (see FIGS. 3A and 3B) to be described later in the form of a table in accordance with a handling instruction from an operator input via the operation input unit 5.

The data acquisition unit 4 is a device that can acquire data on, for example, actual measurement values of the 3-dimensional surface roughness parameters of the workpiece. The data acquisition unit 4 is formed of any one of or a plurality of a personal computer (PC), a network communication terminal device and a device for reading storage media (for example, a CD-ROM).

The operation input unit 5 is a device that can receive input of various text information, numerical data, operating instructions, motion instructions, and the like from an operator. The operation input unit 5 is made up of, for example, a keyboard, a mouse and a touch panel (not shown). The input control unit 6 acquires various types of data acquired by the data acquisition unit 4 and data/instructions input via the operation input unit 5 and stores this information in the storage unit 7 or the database device 8 using the data control unit 9.

The storage unit 7 is an internal storage device that stores data and various programs executed by the control unit 10 and the machining condition processing unit 11. The storage unit 7 is made up of, for example, a semiconductor memory and a hard disk device. The database device 8 is an external storage device that stores data on, for example, the actual measurement values of the 3-dimensional surface roughness parameters acquired by the data acquisition unit 4 as well as data such as the machining condition contribution data and the machining condition selection data to be described later. The data control unit 9 stores data in the database device 8 and sends data that is read out from the database device 8 to the display control unit 3.

The control unit 10 is a unit that integrally controls the operation of the machining condition selecting device 1 and is made up of a central processing unit (CPU) and a microprocessor that includes components such as memory. The control unit 10 reads out and executes, for example, an operating system and application programs from the storage unit 7 to realize various functions in cooperation with various hardware. Note that functions of the machining condition processing unit 11 to be described later may be partly or entirely executed by the control unit 10.

The machining condition processing unit 11 is made up of a CPU and a microprocessor that includes components such as memory. The machining condition processing unit 11 reads out and executes an application program (the machining condition selection program) for selecting machining conditions from the storage unit 7 to create various types of data to be described later and display that data on the display device 2 in cooperation with various hardware. The machining condition processing unit 11 includes a machining condition contribution data management unit 111, a matter of priority acquisition unit 112 and a machining condition selection data management unit 113. Functions of the above-described units that make up the machining condition processing unit 11 are described later with reference to the drawings.

The machining condition contribution data management unit 111 manages machining condition contribution data in which each of a plurality of machining conditions that can be performed when a machine tool processes a workpiece is associated with a degree of contribution toward items of 3-dimensional surface roughness parameters and required conditions to be described later. The machining condition contribution data is described later.

The machining condition contribution data management unit 111 acquires actual measurement values and target values of the 3-dimensional surface roughness parameters to be described later. The actual measurement value of the 3-dimensional surface roughness parameter is a value obtained by measuring the cutting surface of the workpiece (Str, Sdq and the like to be described later). The actual measurement values of the 3-dimensional surface roughness parameters are, for example, input to the data acquisition unit 4 and temporarily stored in the storage unit 7. The target value of the 3-dimensional surface roughness parameter is a value specified by the operator. The target values of the 3-dimensional surface roughness parameters are, for example, input to the operation input unit 5 and temporarily stored in the storage unit 7.

Note that the 3-dimensional surface roughness parameters acquired by the machining condition contribution data management unit 111 include all items set as a 3-dimensional surface roughness parameter. For example, if a depth parameter, a spatial parameter and a composite parameter (described later) are all set as 3-dimensional surface roughness parameters, the 3-dimensional surface roughness parameters acquired by the machining condition contribution data management unit 111 are the depth parameter, the spatial parameter and the composite parameter. In this embodiment, the set 3-dimensional surface roughness parameters are the spatial parameter and the composite parameter. Therefore, the 3-dimensional surface roughness parameters acquired by the machining condition contribution data management unit 111 are the spatial parameter and the composite parameter.

On the other hand, the 3-dimensional surface roughness parameters acquired by the matter of priority acquisition unit 112 to be described later are the parameters set by the operator. Therefore, even if the spatial parameter and the composite parameter are set as the 3-dimensional surface roughness parameters, those two parameters are not guaranteed to be specified. For instance, sometimes both the spatial parameter and the composite parameter will be specified, and sometimes only one of the spatial parameter and the composite will be specified.

The machining condition contribution data management unit 111 compares the actual measurement values and the target values of the 3-dimensional surface roughness parameters acquired by the storage unit 7. If there is a 3-dimensional surface roughness parameter with an actual measurement value that does not meet a target value, the machining condition contribution data management unit 111 displays that parameter on the display device 2. The operator then specifies the 3-dimensional surface roughness parameter needed for the matter of priority by referring to the 3-dimensional surface roughness parameter displayed on the display device 2.

Figure 2:
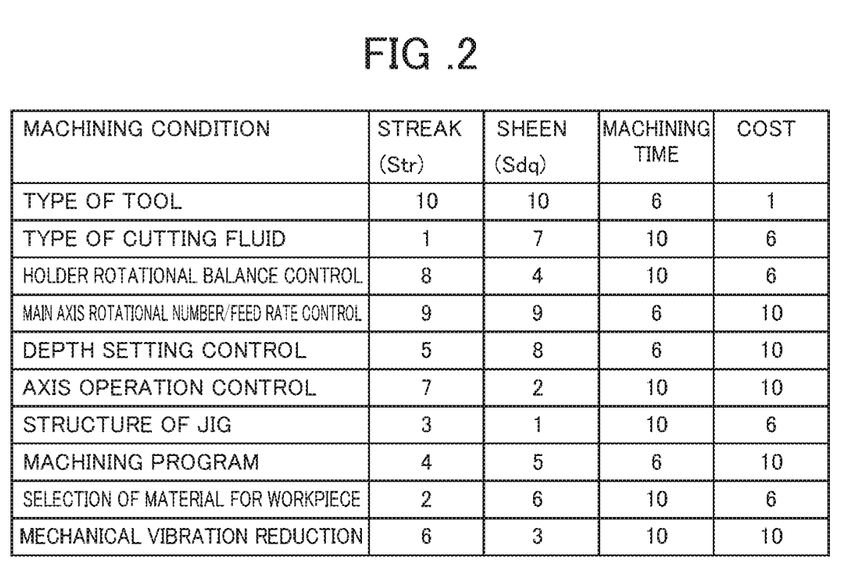
FIG. 2 is a data table for showing an example of machining condition contribution data.

FIG. 2 is a data table showing an example of machining condition contribution data. The machining condition contribution data is stored in the database device 8 (see FIG. 1). Machining conditions and degrees of contribution included in the machining condition contribution data are described below. Of the machining condition contribution data illustrated in FIG. 2, the machining conditions are control elements that a machine tool can execute when performing high-quality machining on a workpiece. In this embodiment, the machining conditions are the following 10 items: type of tool, type of cutting fluid, holder rotational balance control, main axis rotational number/feed rate control, depth setting control, axis motion control, structure of jig, machining program, selection of material for workpiece, and mechanical vibration reduction.

Of the machining condition contribution data illustrated in FIG. 2, the degree of contribution quantifies how much the control elements contribute to achieving the matters of priority (visual quality, machining time and cost). A higher degree of contribution indicates a higher rate of contributing to achieving the matters of priority. In the first embodiment, the degree of contribution is shown on a 10-point scale (1 to 10). For example, the type of tool (described later) significantly contributes to the streak and sheen of the product, which determines visual quality, but does not significantly contribute to cost because an expensive material needs to be selected to achieve high visual quality. Each item of the machining conditions and the degree of contribution thereof are now described.

Type of tool is a control element related to the type of material that forms the cutting tool. Materials generally used for cutting tools include monocrystalline diamond (MCD), polycrystalline diamond (PCD) and cemented carbide. Among these materials, cemented carbide can be made to have the sharpest tip, polycrystalline diamond the second sharpest tip, and monocrystalline diamond the third sharpest tip. Therefore, a workpiece can be formed with a higher quality cutting surface when a material that can be made to have a sharper tip is selected. As illustrated in FIG. 2, the type of tool selected significantly contributes to the visual quality of the product but does not significantly contribute to shortening machining time and reducing cost.

Cutting fluid is lubricant supplied between the cutting surface of the workpiece and the cutting tool that acts to lower cutting resistance and cool the tool. Cutting fluids are broadly categorized into water insoluble lubricants and water soluble lubricants. Using a water insoluble lubricant reduces cutting resistance and enables a high-quality cutting surface to be formed. As illustrated in FIG. 2, the type of selected cutting fluid does not significantly contribute to reducing streaks but significantly contributes to sheen. In addition, the type of cutting fluid significantly contributes to shortening machining time but does not significantly contribute to reducing cost (degree of contribution is around average).

Holder rotational balance control is a control element related to rotational balance of a holder that holds the cutting tool. Optimizing the rotational balance of the holder reduces vibration at high speeds. Therefore, a higher quality cutting surface can be formed. As illustrated in FIG. 2, controlling the rotational balance of the holder contributes relatively significantly to reducing streaks and shortening machining time but does not significantly contribute to sheen and reducing costs.

Main axis rotational number/feed rate control is a control element related to the rotational number of the cutting tool and the feed rate of the cutting surface of the workpiece.

Note that the main axis is a main axis unit that performs machining by clamping a tool holder to be described later and rotating a cutting tool that is held by the tool holder. Vibration of the cutting tool when the cutting tool is rotated varies depending on rotational number and is largest in a resonance range. Because of this, selecting a rotational number at which vibration is minimal suppresses vibration of the cutting tool and makes it possible to form a higher quality cutting surface. The feed rate is preferably balanced with the rotational number and set to a rate at which the cutting surface becomes less uneven. In the case of hale machining, the fastest rate possible is preferably selected. As illustrated in FIG. 2, controlling the main axis rotational number/feed rate significantly contributes to the streak and sheen as well as reducing cost but does not significantly contribute to shortening machining time.

Depth setting control is a control element related to depth setting in the axial direction (Ap) and depth setting in the radial direction (Ae). The depth setting is preferably as small as possible in order to reduce deflection of the cutting tool and form a higher quality cutting surface. As illustrated in FIG. 2, controlling the depth setting significantly contributes to sheen and cost but does not significantly contribute to streaks and shortening machining time.

Axis motion control is a control element mainly related to the feed motion of a feed axis. Current of a servo motor that drives the feed axis is preferably controlled more precisely in order to reduce feed irregularities in the feed axis and enable smoother motion. As illustrated in FIG. 2, controlling the axis motion significantly contributes to streak, shortening machining time and reducing costs but does not significantly contribute to sheen.

Structure of jig is a control element related to the structure of a jig that is a member for fixing work. When vibration occurs in the jig during cutting, that vibration is transferred to the workpiece and a high-quality cutting surface cannot be obtained. Therefore, the jig preferably has a structure that suppresses vibration as much as possible. As illustrated in FIG. 2, the structure of the jig does not significantly contribute to streak and sheen but significantly contributes to shortening machining time and reducing cost.

Machining program is a control element related to a program that moves the cutting tool. A high-quality cutting surface can be formed by shortening travel (travel pitch per unit time) of the cutting tool and controlling the cutting tool so as to travel on a smoother tool trajectory. As illustrated in FIG. 2, the machining program does not significantly contribute to streak, sheen and shortening machining time but significantly contributes to reducing cost.

Selection of material for workpiece is a control element related to the material of the workpiece. Selecting a more even and rigid material for the workpiece can produce a high-quality cutting surface. As illustrated in FIG. 2, the selection of the material for the workpiece significantly contributes to shortening machining time but does not significantly contribute to sheen and reducing cost. In addition, the selection of the material for the workpiece does not significantly contribute to sheen.

Reduction of mechanical vibration is a control element related to vibration of the cutting tool. If vibration of a rotational body such as a pump or a fan around the cutting tool affects vibration at the tip of the cutting tool, a high-quality cutting surface can be obtained by eliminating the source of vibration as much as possible. As illustrated in FIG. 2, reducing mechanical vibration significantly contributes to shortening machining time and reducing cost but does not significantly contribute to streak. In addition, reducing mechanical vibration does not significantly contribute to sheen.

Returning to FIG. 1, the configuration of the machining condition selecting device 1 is once again described. The matter of priority acquisition unit 112 acquires a combination of at least one item of the 3-dimensional surface roughness parameter to be described later and at least one item of the required conditions as the matters of priority specified by the operator. The 3-dimensional surface roughness parameter is a parameter that indicates 3-dimensional roughness of the cutting surface of the workpiece. As described later, the 3-dimensional surface roughness parameter includes a plurality of parameters. The 3-dimensional surface roughness parameter specified by the operator may include a plurality of parameters or may be only one parameter.

The required conditions are conditions related to productivity of the workpiece. In this embodiment, the required conditions are machining time and cost. The machining time is the time it takes to prepare machining conditions, perform the machining conditions, and the like. The cost is the costs necessary for performing the machining conditions. The required condition specified by the operator may include both of the machining time and the cost or may include only one of the machining time and the cost.

The above-mentioned 3-dimensional surface roughness parameters and the matters of priority including the required conditions are input by the operator to the operation input unit 5 and temporarily stored in the storage unit 7. The matter of priority acquisition unit 112 reads out data related to the matters of priority from the storage unit 7 to thereby acquire the matters of priority specified by the operator.

The 3-dimensional surface roughness parameter is now described. The 3-dimensional surface roughness parameter is a parameter that indicates the 3-dimensional roughness of the cutting surface of a workpiece. The 3-dimensional surface roughness parameter includes at least one of a depth parameter that indicates the depth of roughness in the cutting surface of the workpiece, a spatial parameter that indicates presence (degree) of streak on the cutting surface of the workpiece, and a composite parameter that indicates sheen of the cutting surface of the workpiece.

Examples of the depth parameter include Sa (arithmetical mean depth) and Sz (maximum depth). Examples of the spatial parameter include Sal (minimum autocorrelation length) and Str (texture aspect ratio). Examples of the composite parameter include Sdq (root mean square gradient) and Sdr (developed interfacial area ratio). Each of these parameters is represented by a numerical value in accordance with an international surface texture standard (ISO 25178).

In this embodiment, an example is described in which the spatial parameter Str (texture aspect ratio) is used as an index that indicates streak in the cutting surface of the workpiece and the composite parameter Sdq (root mean square gradient) is used as an index that indicates sheen of the cutting surface of the workpiece. In the first embodiment, one parameter is used to indicate each of streak and sheen but, as described later, a plurality of parameters may be used to indicate each of streak and sheen.

As described above, two-dimensional surface roughness parameters such as Ra (arithmetical mean roughness) and Rz (maximum roughness depth) are not always sufficient for quantitatively expressing the cutting surface of a workpiece, in particular the visual quality of a cutting surface that looks like a mirror. This is because cutting surfaces of workpieces may have different visual quality when compared despite having the same two-dimensional roughness parameters. However, as one of the matters of priority, visual quality of a cutting surface of a workpiece can be quantitatively expressed using the above spatial parameters (Str, etc.), composite parameters (Sdq, etc.) and others. The 3-dimensional surface roughness parameters (streak, sheen) included in the above-mentioned matters of priority and each item of the machining time and cost can be combined in a plurality of different patterns. Specific examples of these combination patterns are described later.

Figure 3A:
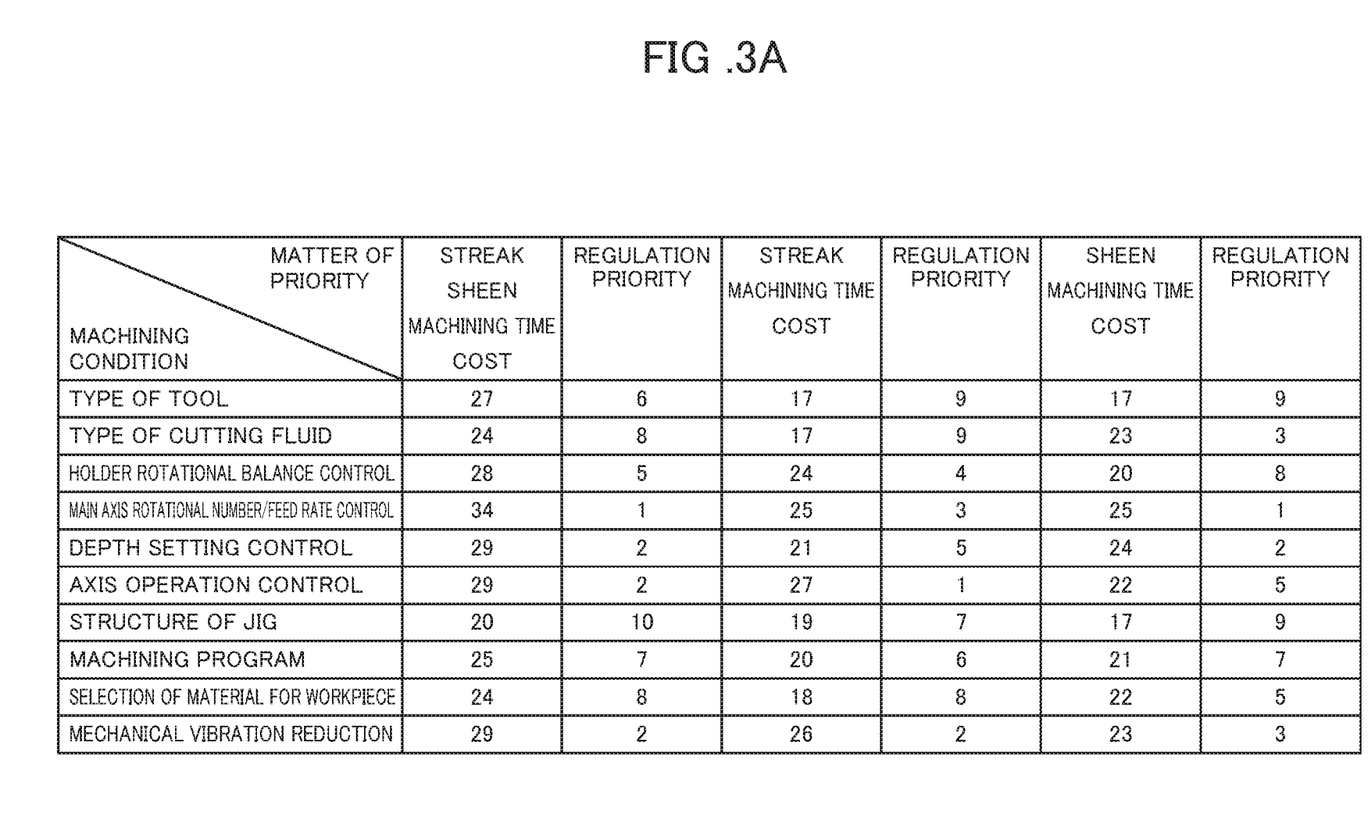
FIG. 3A is a data table for showing an example of machining condition selection data.
Figure 3B:
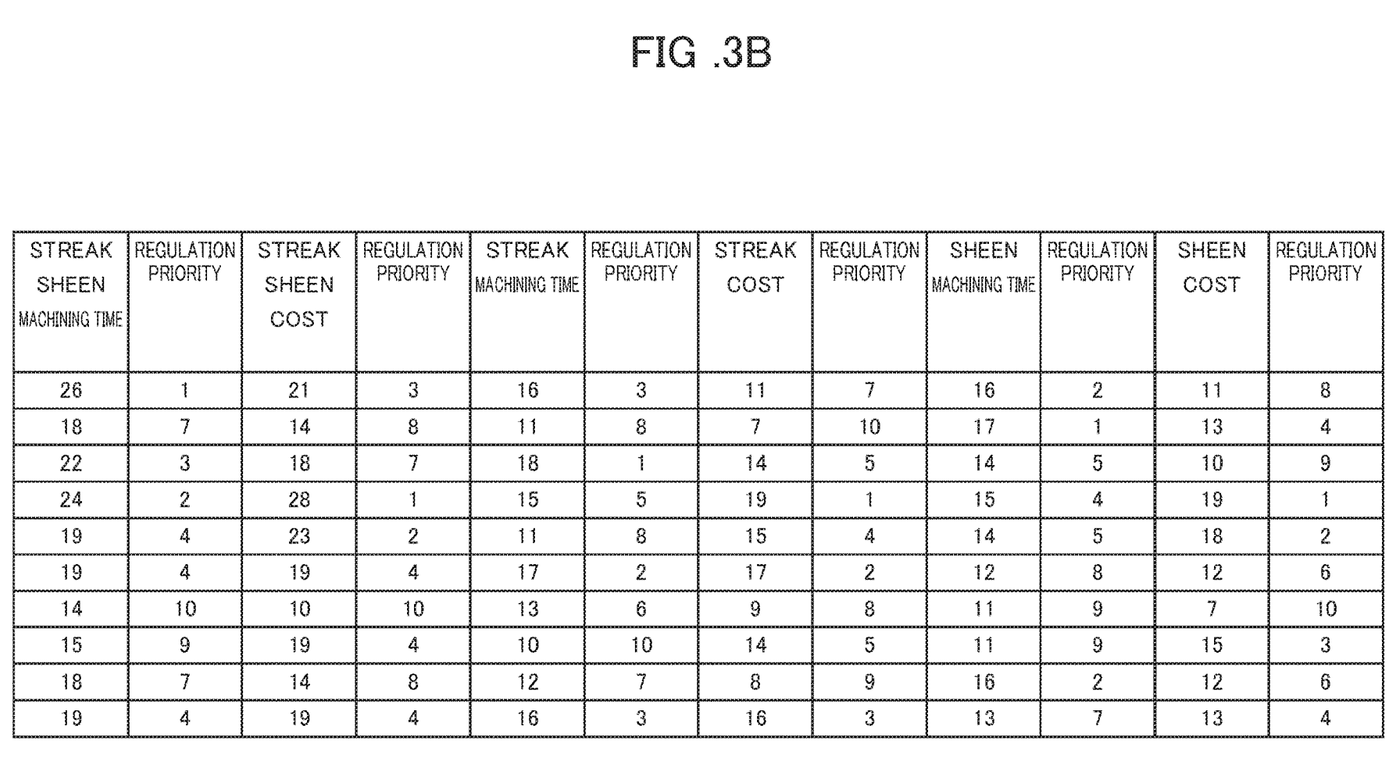
FIG. 3B is a data table for showing an example of machining condition selection data.

The machining condition selection data management unit 113 manages machining condition selection data to be described later. FIGS. 3A and 3B are data tables showing examples of machining condition selection data. Note that FIG. 3B is a continuation of the right side of FIG. 3A. The machining condition selection data is an amalgamation of rows of data in which, for each of a plurality of machining conditions, a sum for each matter of priority and the priority of the sum (hereinafter also referred to "regulation priority") are associated with each other. The machining condition selection data is stored in the database device 8 (see FIG. 1).

As illustrated in FIGS. 3A and 3B, the matters of priority are classified into 9 types of combination patterns based on the combination of "streak", "sheen", "machining time" and "cost". For example, for the matters of priority of the machining condition selection data illustrated in FIG. 3A, the combination pattern furthest to the left includes all of "streak", "sheen", "machining time" and "cost". For the matters of priority of the machining condition selection data illustrated in FIG. 3B, the combination pattern furthest to the right includes the two items "sheen" and "cost". The matters of priority "streak" and "sheen" are determined on the basis of, for example, a 3-dimensional surface roughness parameter displayed on the display device 2 with an actual measurement value that does not meet the target value. The matters of priority "machining time" and "cost" are determined on the basis of, for example, the specifications of the workpiece, requests of a customer, or the like. The combination pattern of the matters of priority is specified by the operator via the operation input unit 5.

In the machining condition selection data illustrated in FIGS. 3A and 3B, the sums of the degrees of contribution illustrated in FIG. 2 are recorded at positions (columns) at which items of the machining conditions and items of the matters of priority intersect. For example, the numerical value at the position at which the item "type of tool" and the item of the matters of priority including "streak, sheen, machining time, cost" intersect has a sum of 27 because the values of the degree of contribution of each item in FIG. 2 are as follows: "streak=10", "sheen=10", "machining time=6" and "cost=1". In addition, in the machining condition selection data illustrated in FIGS. 3A and 3B, the regulation priority columns located to the right of the matters of priority columns shows the priority of the sums. For example, as illustrated in FIG. 3A, the "type of tool" described above has the sixth highest regulation priority among the matters of priority including "streak, sheen, machining time, cost". The matter with the highest regulation priority among the matters of priority including "streak, sheen, machining time, cost" is the axis motion control.

The machining condition selection data management unit 113 selects a machining condition to be prioritized on the basis of the sum of degrees of contribution associated with the combination pattern of the machining condition selection data (described later) matching the combination of the matters of priority acquired by the matter of priority acquisition unit 112. In this embodiment, the machining condition selection data management unit 113 selects the machining condition with the highest sum of degrees of contribution as the machining condition to be prioritized.

The machining condition selection data management unit 113 displays the name of the item of the selected machining condition (for example, "type of tool") on the display device 2 using the display control unit 3. Then, the operator regulates the machine tool on the basis of the machining condition and the like displayed on the display device 2. With this configuration, the operator can use the machine tool to efficiently perform high-quality machining on a workpiece.

Figure 4:
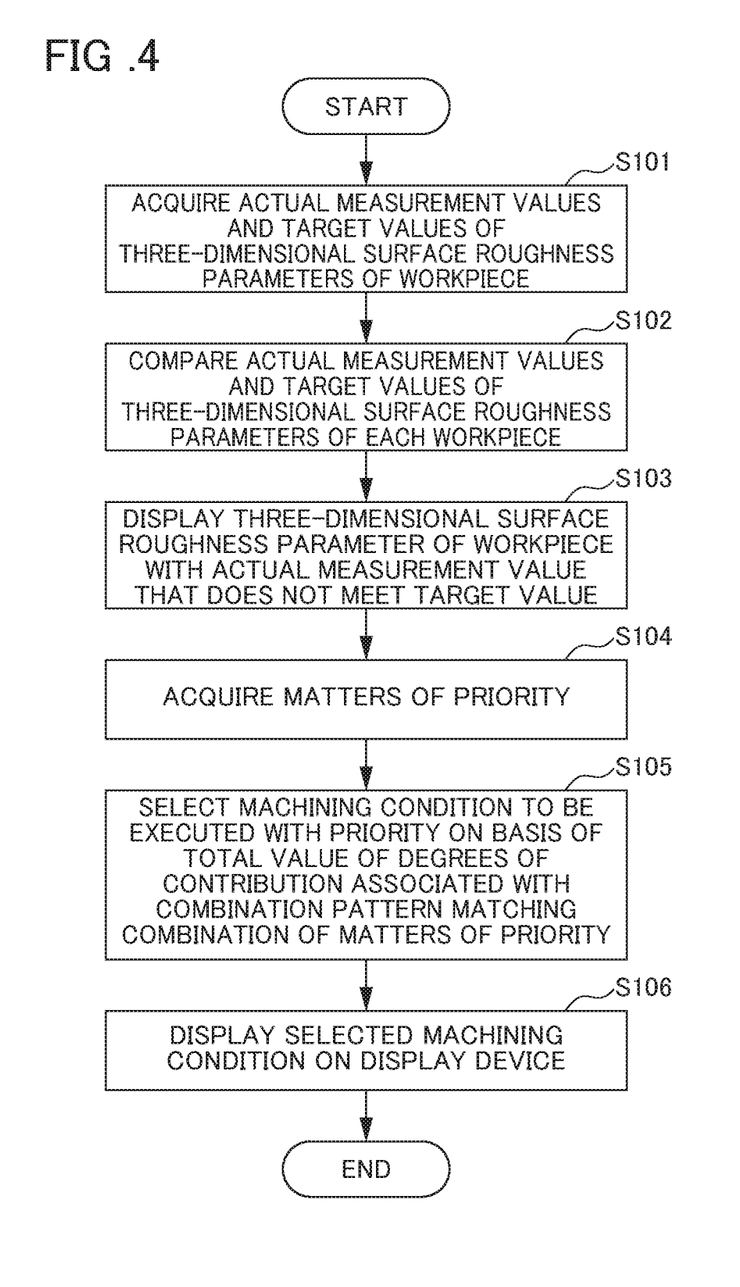
FIG. 4 is a flow chart for illustrating a processing procedure of a machining condition selection program executed by the machining condition selecting device 1 according to the first embodiment.

Next, processing content of a machining condition selection program executed by the machining condition selecting device 1 according to the first embodiment is described with reference to the flowchart of FIG. 4. FIG. 4 is a flowchart for illustrating a processing procedure of the machining condition selection program executed by the machining condition selecting device 1 according to the first embodiment.

In Step S101 illustrated in FIG. 4, the machining condition contribution data management unit 111 acquires the actual measurement values and the target values of the 3-dimensional surface roughness parameters of the workpiece. The 3-dimensional surface roughness parameters acquired in this step are all of the items set as the 3-dimensional surface roughness parameter (in this example, the spatial parameter and the composite parameter). In Step S102, the machining condition contribution data management unit 111 compares the actual measurement values and the target values of the 3-dimensional surface roughness parameters.

In Step S103, when a 3-dimensional surface roughness parameter having an actual measurement value that does not meet a target value is detected, the machining condition contribution data management unit 111 displays that 3-dimensional surface roughness parameter on the display device 2. Note that, although not shown in the drawings, when all of the actual measurement values of the 3-dimensional surface roughness parameters meet the target values, a message indicating that there is no 3-dimensional surface roughness parameter with an actual measurement value that does not meet a target value is displayed on the display device 2 and the processing of this flowchart is ended. This is because, in this case, there is no need to machine the workpiece to a higher quality.

In Step S104, the matter of priority acquisition unit 112 acquires a combination of at least one item of the 3-dimensional surface roughness parameter and at least one item of the required condition as the matter of priority specified by the operator.

Note that the matter of priority specified by the operator may be input before executing the processing of this flowchart. For example, if the combination of "streak", "sheen", "machining time" and "cost" is already specified as the matter of priority and the actual measurement value of the 3-dimensional surface roughness parameter indicating streak meets the target value but the actual measurement value of the 3-dimensional surface roughness parameter indicating sheen does not meet the target value, in Step S103, the matter of priority acquisition unit 112 acquires a combination of "sheen", "machining time" and "cost" without streak as the matter of priority specified by the user.

In Step S105, the machining condition selection data management unit 113 selects a machining condition to be executed with priority on the basis of the sum of degrees of contribution associated with the combination pattern of the machining condition selection data (see FIGS. 3A and 3B) matching the combination of matters of priority acquired by the matter of priority acquisition unit 112.

For example, in Step S104, if the operator specifies all of "streak", "sheen", "machining time" and "cost" as the matter of priority, in the machining condition selection data illustrated in FIG. 3A, the machining condition with the highest sum among the sums of degrees of contribution (20 to 34) associated with the combination pattern matching the combination specified by the operator is the "main axis rotational number/feed rate control". On the other hand, if the operator specifies "sheen" and "machining time" as the matter of priority, in the machining condition selection data illustrated in FIG. 3B, the machining condition with the highest sum among the sums of degrees of contribution (11 to 17) associated with the combination pattern matching the combination specified by the operator is the "type of cutting fluid".

In Step S106, the machining condition selection data management unit 113 displays, for example, "main axis rotational number/feed rate control" or "type of cutting fluid" on the display device 2 using the display control unit 3 as the name of the item of the selected machining condition. After executing the processing in Step S106, the machining condition processing unit 11 (see FIG. 1) ends the processing of this flowchart due to, for example, an instruction from the operator to end the machining condition selection program.

With the machining condition selecting device 1 according to the above-described first embodiment, the machining condition with the highest sum of degrees of contribution for the matter of priority specified by the operator can be selected as a machining condition to be executed with priority. Because of this, the operator can regulate the machine tool on the basis of the machining condition displayed on the display device 2, to thereby effectively perform high-quality machining on a workpiece.

Second Embodiment

Next, a second embodiment of the present invention is described. In the second embodiment, portions that have the same function as those in the above-described first embodiment are described while being denoted with the same reference symbols. The machining condition contribution data management unit 111 according to the second embodiment compares the actual measurement values and the target values of the 3-dimensional surface roughness parameters acquired from the storage unit 7 and, if there is a 3-dimensional surface roughness parameter with an actual measurement value that does not meet the target value, calculates the different value between the two values. Then, the machining condition contribution data management unit 111 changes the degree of contribution set in the 3-dimensional surface roughness parameter in the machining condition contribution data (see FIG. 2) on the basis of the calculated different value.

For example, if the spatial parameter Str (texture aspect ratio) as the 3-dimensional surface roughness parameter has an actual measurement value of 0.1 and a target value of 0.5, the different value between these two values is 0.4. The machining condition contribution data management unit 111 increases a coefficient (weighting value) as the different value increases and multiplies the coefficient by the degree of contribution set for each of the plurality of machining conditions in the machining condition selection data illustrated in FIG. 2 (hereinafter also referred to as "weighting the degrees of contribution"). Note that the spatial parameter Str is a value from 0 to 1 and indicates more directional dependency (streak, etc.) closer to 0 and less directional dependency toward the surface closer to 1.

Here, the coefficient is within a range of, for example, 1.1 to 2.0. In this example, the coefficient when the different value is at a minimum is 1.1 and the coefficient when the different value is at a maximum is 2.0. For example, when the different value is at a maximum, in the machining condition selection data illustrated in FIG. 2, the degree of contribution of the machining condition "type of tool" to streak becomes 10×2.0 (coefficient)=20. For other machining conditions, the coefficient is multiplied by the degree of contribution in the same way.

When the degree of contribution in the standard machining condition contribution data has been weighted, the machining condition contribution data management unit 111 stores the newly created machining condition contribution data in the storage unit 7 as data separate to the standard machining condition contribution data. In other words, by weighting the degrees of contribution, the standard machining condition contribution data is still stored in the storage unit 7 even when machining condition contribution data is newly created.

When the machining condition contribution data management unit 111 newly creates machining condition contribution data, the machining condition selection data management unit 113 according to the second embodiment changes the sum of degrees of contribution and the regulation priority in the machining condition selection data (see FIGS. 3A and 3B) on the basis of the changed degree of contribution. Due to this change, the sums of degrees of contribution and the regulation priorities in the machining condition selection data reflect the result of weighting the degrees of contribution in the new machining condition contribution data.

Figure 5:
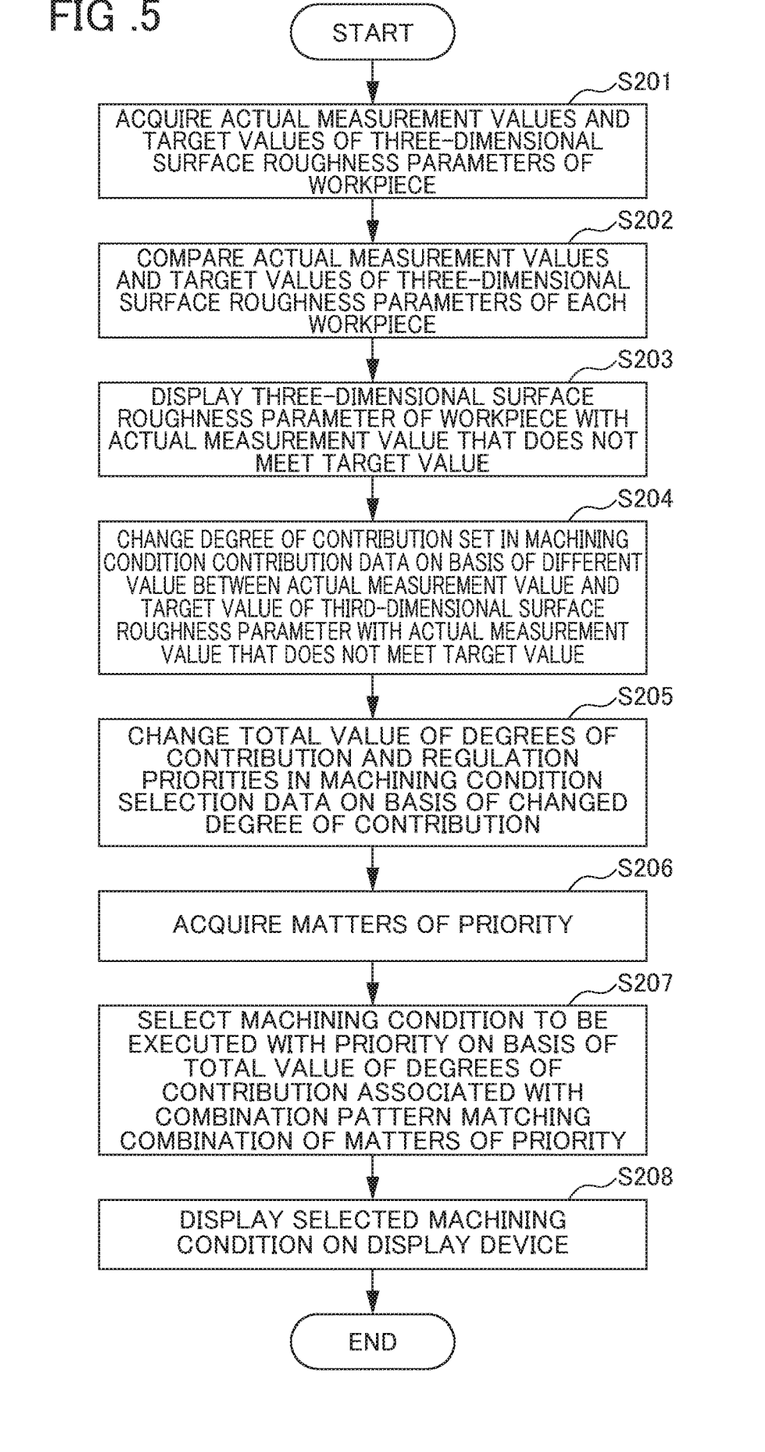
FIG. 5 is a flow chart for illustrating a processing procedure of a machining condition selection program executed by a machining condition selecting device 1 according to a second embodiment.

Next, processing content of a machining condition selection program executed by the machining condition selecting device 1 according to the second embodiment is described with reference to the flowchart illustrated in FIG. 5. FIG. 5 is a flow chart for illustrating a processing procedure of the machining condition selection program executed by a machining condition selecting device 1 according to the second embodiment. Note that the processing of Steps S204 and S205 in the flowchart of FIG. 5 may be executed as a subroutine.

In Step S201 illustrated in FIG. 5, the machining condition contribution data management unit 111 acquires the actual measurement values and the target values of the 3-dimensional surface roughness parameters of the workpiece. The 3-dimensional surface roughness parameters acquired in this step are all of the items set as the 3-dimensional surface roughness parameter. In Step S202, the machining condition contribution data management unit 111 compares the actual measurement values and the target values of the 3-dimensional surface roughness parameters.

In Step S203, if a 3-dimensional surface roughness parameter with an actual measurement value that does not meet a target value is detected, the machining condition contribution data management unit 111 displays that 3-dimensional surface roughness parameter on the display device 2. Although not shown in the drawings, when all of the actual measurement values of the 3-dimensional surface roughness parameters meet the target values, a message indicating that there is no 3-dimensional surface roughness parameter with an actual measurement value that does not meet a target value is displayed on the display device 2 and the processing of this flowchart is ended.

In Step S204, the machining condition contribution data management unit 111 calculates the different value between the actual measurement value and the target value of the 3-dimensional surface roughness parameter with an actual measurement value that does not meet a target value. Then, the machining condition contribution data management unit 111 changes the degree of contribution set in the 3-dimensional surface roughness parameter of the machining condition contribution data (see FIG. 2) on the basis of the calculated different value.

In Step S205, the machining condition selection data management unit 113 changes the sum of the degrees of contribution and the regulation priority in the machining condition selection data (see FIGS. 3A and 3B) on the basis of the degree of contribution in the newly created machining condition contribution data.

In Step S206, the matter of priority acquisition unit 112 acquires a combination of at least one item of the 3-dimensional surface roughness parameter and at least one item of the required condition as the matter of priority specified by the operator. Note that the matter of priority specified by the operator may be acquired before the processing of Step S204 and Step S205 is executed.

In Step S207, the machining condition selection data management unit 113 selects a machining condition to be executed with priority on the basis of the sum of degrees of contribution associated with the combination pattern of the machining condition selection data (see FIGS. 3A and 3B) matching the combination of the matters of priority acquired by the matter of priority acquisition unit 112.

In Step S208, the machining condition selection data management unit 113 displays the name of the item of the selected machining condition on the display device 2 using the display control unit 3. After executing the processing in Step S208, the machining condition processing unit 11 (see FIG. 1) ends the processing of this flowchart due to, for example, an instruction from the operator to end the machining condition selection program.

With the machining condition selecting device 1 according to the above-described second embodiment, the degrees of contribution in the machining condition contribution data and the sum of the degrees of contribution and the regulation priority in the machining condition selection data are changed on the basis of the different value of the actual measurement values and the target values of the 3-dimensional surface roughness parameters. With this configuration, because more appropriate machining conditions are selected according to the different value in values, high-quality machining can be performed on a workpiece more efficiently.

Embodiments of the present invention are described above, but the present invention is not limited to the above-described embodiments and may be changed or altered as described in the modified aspects below. The modified aspects are also included in the technical scope of the present invention. Further, the effects described in the embodiments are merely examples of the most favorable effects achieved by the present invention and are not limited thereto. Note that the above-described embodiments and the modified aspects to be described below can be combined as necessary, but a detailed description of this is omitted.

(Modified Aspects)

In the embodiments, there is described an example in which a spatial parameter and a composite parameter are set as the 3-dimensional surface roughness parameter, but the parameter is not limited thereto. The 3-dimensional surface roughness parameter may include at least one of the depth parameter, the spatial parameter and the composite parameter.

In the embodiments, there is described an example in which the spatial parameter Str (texture aspect ratio) is used as the index that represents streak and the composite parameter Sdq (root mean square gradient) is used as the index that represents sheen, but the indexes are not limited thereto. As the index that represents streak, the spatial parameter Sal (minimum autocorrelation length) may be used, or both Sal and Str may be used. Similarly, as the index that represents sheen, the composite parameter Sdr (developed interfacial area ratio) may be used, or both Sdr and Sdq may be used. For example, if both Sal and Str are used as the spatial parameter that represents streak, a contribution is set for each of Sal and Str in the machining condition contribution data (see FIG. 2). The same applies to the composite parameter representing sheen.

Note that if a plurality of 3-dimensional surface roughness parameters is set for each of the indexes that represent streak and sheen, the actual measurement value and target value of each of those 3-dimensional surface roughness parameters is compared, and the different value between those values is calculated for each 3-dimensional surface roughness parameter. In this way, the rate of contribution may be different for each parameter when a plurality of 3-dimensional surface roughness parameters is set for each of the indexes that represent streak and sheen.

If a plurality of 3-dimensional surface roughness parameters is set for each of the indexes that represent streak and sheen, the coefficient (weighting value) set according to the different value between the actual measurement value and the target value may be different for each parameter and, if the different value is small, the contribution may not be weighted. The contribution may be weighted uniformly for all machining conditions, or only the contribution of a particular machining condition, for example, the machining condition having the highest contribution rate at the time may be weighted. The coefficient is not limited to being multiplied by the contribution as in the example in the embodiments and may be added to the contribution.

In addition, because a ratio (target value/actual measurement value) of the actual measurement value to the target value can be calculated if the different value is known, the ratio may be multiplied by the degree of contribution. For example, if the spatial parameter Str (texture aspect ratio) has an actual measurement value of 0.1 and a target value of 0.5, the ratio of the actual measurement value to the target value is 5, and hence a coefficient of 5 is multiplied by the degree of contribution. Similarly, if the actual measurement value is 0.25 and the target value is 0.5, the ratio of the actual measurement value to the target value is 2, and hence a coefficient of 2 may be multiplied by the degree of contribution.

In the embodiments, there is described an example in which 10 items are set as the machining conditions of the machining condition contribution data, but the number of items is not limited thereto. The machining conditions of the machining condition contribution data need only include at least two of the above-mentioned 10 items. In addition, there may be more than 10 machining conditions in the machining condition contribution data. For example, one machining condition may be the structure of a tool holder that clamps the cutting tool. Structure of a tool holder is a control element mainly related to a vibration control structure of the tool holder. For example, a hydraulic chuck with a vibration control structure or a vibration control sleeve can be used as the tool holder, to thereby form a high-quality cutting surface.

In the embodiments, data acquisition and data calculation by each of the machining condition contribution data management unit 111 and the machining condition selection data management unit 113 may be executed by the control unit 10. In this case, processing performed by the machining condition contribution data management unit 111 and the machining condition selection data management unit 113 of overwriting the data tables is executed by the database device 8 (see FIG. 1). In this way, the machining condition contribution data management unit 111 and the machining condition selection data management unit 113 may be storage media (for example, the database device 8) that can, for example, store and overwrite data tables in a case where the configuration of the machining condition selecting device 1 has been simplified.

EXPLANATION OF REFERENCE NUMERALS

1: machining condition selecting device, 7: storage unit, 8: database device, 10: control unit, 11: machining condition processing unit, 111: machining condition contribution data management unit, 112: matter of priority acquisition unit, 113: machining condition selection data management unit

What is claimed is:

1. A machining condition selecting device for a machine tool, comprising:
   a processor configured to perform the processes of:
   managing machining condition contribution data in which each of a plurality of machining conditions that a machine tool can perform when machining a target product is associated with degrees of contribution to each item of a 3-dimensional surface roughness parameter of a cutting surface of the target product and degrees of contribution to each item of a required condition related to productivity of the target product;
   acquiring a combination of at least one item of the 3-dimensional surface roughness parameter and at least one item of the required condition as a matter of priority specified by an operator;

managing, for each of the plurality of machining conditions, machining condition selection data in which a combination pattern of items that can be specified as the matter of priority is associated with a sum of the degrees of contribution to each item in the combination pattern;

selecting a machining condition on the basis of the sum of the degrees of contribution associated with the combination pattern of the machining condition selection data matching the combination of the matters of priority;

acquiring actual measurement values and target values of each item of the 3-dimensional surface roughness parameter of the cutting surface of the target product as a target surface; and outputting each item of the 3-dimensional surface roughness parameter of the target surface having an actual measurement value that is different from the target value.

2. The machining condition selecting device for a machine tool according to claim 1, wherein the 3-dimensional surface roughness parameter includes at least one of a depth parameter that represents depth of unevenness in the cutting surface of the target product; a spatial parameter that represents presence of streak in the cutting surface of the target product; and a composite parameter that represents sheen of the cutting surface of the target product.

3. The machining condition selecting device for a machine tool according to claim 1, wherein the plurality of machining conditions includes at least two of type of tool, type of cutting fluid, holder rotational balance control, main axis rotational number/feed rate control, depth setting control, axis motion control, structure of jig, machining program, selection of material for workpiece, and mechanical vibration reduction.

4. The machining condition selecting device for a machine tool according to claim 1, wherein the machining conditions are control elements.

5. A machining condition selecting device for a machine tool, comprising:

a processor configured to perform the processes of:

managing machining condition contribution data in which each of a plurality of machining conditions that a machine tool can perform when machining a target product is associated with degrees of contribution to each item of a 3-dimensional surface roughness parameter of a cutting surface of the target product and degrees of contribution to each item of a required condition related to productivity of the target product;

acquiring a combination of at least one item of the 3-dimensional surface roughness parameter and at least one item of the required condition as a matter of priority specified by an operator;

managing, for each of the plurality of machining conditions, machining condition selection data in which a combination pattern of items that can be specified as the matter of priority is associated with a sum of the degrees of contribution to each item in the combination pattern;

selecting a machining condition on the basis of the sum of the degrees of contribution associated with the combination pattern of the machining condition selection data matching the combination of the matters of priority;

changing the degrees of contribution in the machining condition contribution data on the basis of a different value between an actual measurement value and a target value of the 3-dimensional surface roughness parameter included in the matter of priority; and changing the sum of the degrees of contribution in the machining condition selection data on the basis of the changed degrees of contribution in the machining condition contribution data.

* * * * *